(12) United States Patent
Oh et al.

(10) Patent No.: US 12,488,075 B2
(45) Date of Patent: Dec. 2, 2025

(54) BIOMETRIC AUTHENTICATION DEVICE AND FINGERPRINT AUTHENTICATION DEVICE INCLUDING THE SAME

(71) Applicant: Electronics and Telecommunications Research Institute, Daejeon (KR)

(72) Inventors: Kwang Il Oh, Daejeon (KR); Tae Wook Kang, Daejeon (KR); Seong-Eun Kim, Daejeon (KR); Jae-Jin Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 519 days.

(21) Appl. No.: 17/984,398

(22) Filed: Nov. 10, 2022

(65) Prior Publication Data

US 2023/0214467 A1 Jul. 6, 2023

(30) Foreign Application Priority Data

Jan. 3, 2022 (KR) .................. 10-2022-0000221

(51) Int. Cl.
*G06F 21/32* (2013.01)
(52) U.S. Cl.
CPC .................... *G06F 21/32* (2013.01)
(58) Field of Classification Search
CPC ............ G06F 21/32; G06V 40/1306; G06V 40/1365; G06V 40/1382
See application file for complete search history.

(56) References Cited

U.S. PATENT DOCUMENTS

| 9,842,245 | B1 | 12/2017 | Setterberg et al. |
| 2008/0013804 | A1 | 1/2008 | Moon et al. |
| 2011/0123072 | A1 | 5/2011 | Moon et al. |
| 2012/0162403 | A1* | 6/2012 | Bae .................. H04N 7/183 348/E7.085 |
| 2018/0276443 | A1* | 9/2018 | Strohmann ........ G06V 40/1394 |

(Continued)

FOREIGN PATENT DOCUMENTS

| KR | 2003-0066920 | 8/2003 |
| KR | 10-2007-0099426 | 10/2007 |

(Continued)

*Primary Examiner* — Benjamin A Kaplan
(74) *Attorney, Agent, or Firm* — KILE PARK REED & HOUTTEMAN PLLC

(57) ABSTRACT

Disclosed are a biometric authentication device and a fingerprint authentication device including the same. The biometric authentication device includes a clock generator that generates a clock signal, an authentication signal generator that generates an authentication signal based on the clock signal, a transmission electrode that transmits the authentication signal to a contact body, a reception electrode that receives a channel pass signal in which the authentication signal passes through a channel of the contact body, and a biometric authenticator that restores the channel pass signal and compares the restored channel pass signal with the authentication signal to generate a biometric authentication signal indicating whether the contact body is a biological tissue. According to the present disclosure, it is possible to improve the security of a fingerprint authentication device.

14 Claims, 11 Drawing Sheets

(56) References Cited

U.S. PATENT DOCUMENTS

| | | | | |
|---|---|---|---|---|
| 2019/0370527 A1* | 12/2019 | Lee | ............... | G06V 40/1312 |
| 2022/0413788 A1* | 12/2022 | Anderson | .......... | G02B 27/0977 |
| 2023/0063632 A1* | 3/2023 | Robinson-Morgan | ...................... | G06F 21/32 |

FOREIGN PATENT DOCUMENTS

| | | |
|---|---|---|
| KR | 10-2015-0081573 | 7/2015 |
| KR | 10-2019-0030563 | 3/2019 |
| KR | 10-2019-0058081 | 5/2019 |
| KR | 10-2019-0114143 | 10/2019 |

\* cited by examiner

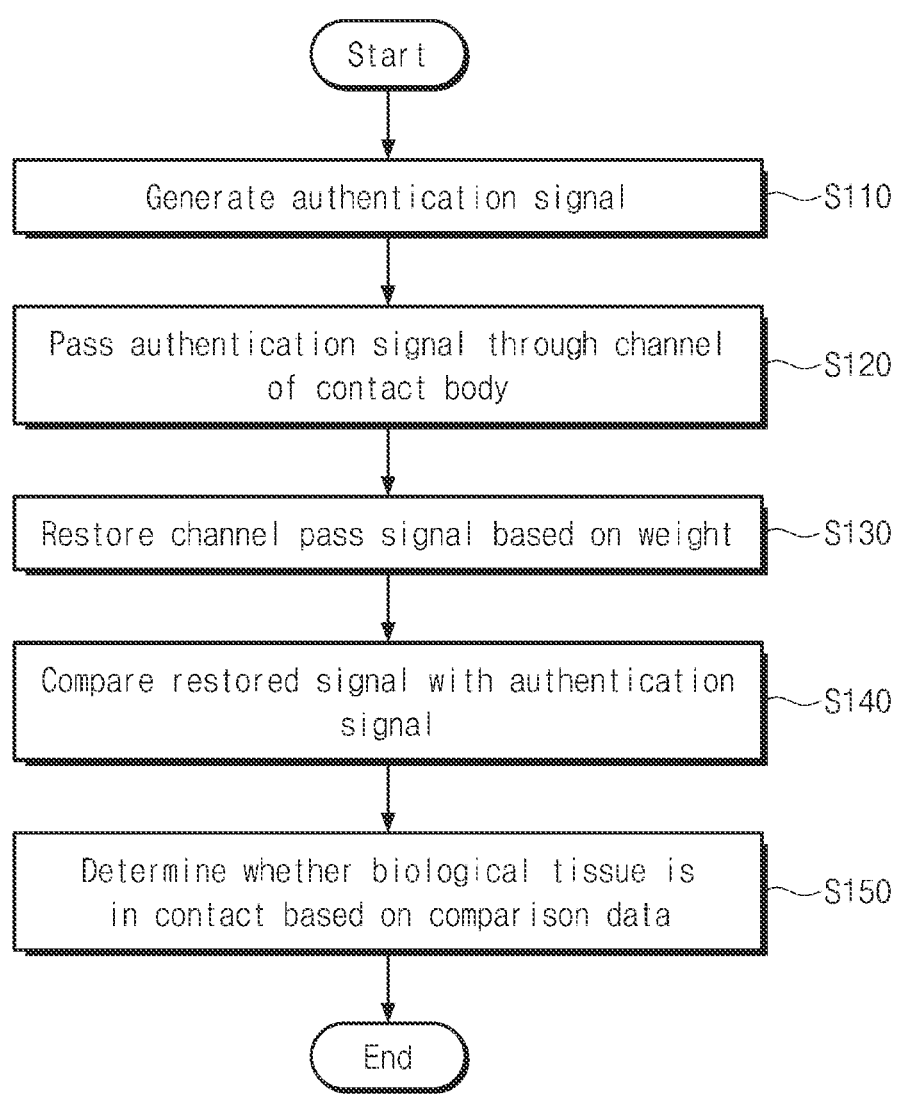

BIOMETRIC AUTHENTICATION DEVICE AND FINGERPRINT AUTHENTICATION DEVICE INCLUDING THE SAME

CROSS-REFERENCE TO RELATED APPLICATIONS

This application claims priority under 35 U.S.C. § 119 to Korean Patent Application No. 10-2022-0000221, filed on Jan. 3, 2022, in the Korean Intellectual Property Office, the disclosures of which are incorporated by reference herein in their entireties.

BACKGROUND

Embodiments of the present disclosure described herein relate to a biometric authentication device and a fingerprint authentication device including the same, and more particularly, relate to a biometric authentication device that determines whether a contact body in contact with the authentication device is a biological tissue by utilizing a channel response characteristic of the biological tissue, and a fingerprint authentication device including the biometric authentication device.

Recently, as the security importance of electronic devices has emerged, biometric recognition technology for personal authentication of electronic devices is being advanced. The biometric recognition technology typically uses authentication through an individual's fingerprint, face, iris, or voice. Among them, fingerprint authentication is based on the fact that each individual has different fingerprint patterns. After a user's unique fingerprint pattern is registered in the electronic device, the fingerprint authentication is performed in a manner that authenticates whether an input user is the registered user by determining whether the registered fingerprint pattern is the same as the input fingerprint pattern.

The fingerprint authentication is divided into types according to how a fingerprint sensor reads an embossed part and an engraved part of the fingerprint pattern, and determines the embossed part and the engraved part. Typically, there are an optical method using an image pickup device, an electrostatic method using a difference in capacitance between an embossed part and an engraved part, and an ultrasonic method using ultrasonic waves reflected by a fingerprint. However, since these determining methods only determine whether the fingerprint pattern matches or not, there is a problem in that security is disabled when these methods are reversely used. In particular, since the fingerprint is exposed outside the body, there is a possibility of being stolen, and another person may use counterfeit or fake fingerprints to disable the security of the electronic device. For example, when a material that can easily imitate a fingerprint pattern is used, the fingerprint authentication device can be easily deceived.

SUMMARY

Embodiments of the present disclosure provide a biometric authentication device that enhances personal authentication security by passing an authentication signal to a contact body in contact with the authentication device to determine whether the contact body is a biological tissue, and a fingerprint authentication device including the same.

According to an embodiment of the present disclosure, a biometric authentication device includes a clock generator that generates a clock signal, an authentication signal generator that generates an authentication signal based on the clock signal, a transmission electrode that transmits the authentication signal to a contact body, a reception electrode that receives a channel pass signal in which the authentication signal passes through a channel of the contact body, and a biometric authenticator that restores the channel pass signal and compares the restored channel pass signal with the authentication signal to generate a biometric authentication signal indicating whether the contact body is a biological tissue.

According to an embodiment of the present disclosure, a method of operating a biometric authentication device includes generating, by an authentication signal generator, an authentication signal, passing the authentication signal through a channel of a contact body through a transmission electrode and a reception electrode, generating, by an equalizer, an equalizer output by restoring the channel pass signal to a signal in a form of a digital sequence based on a tap weight, generating, by a signal comparator, a comparison signal obtained by comparing the equalizer output with the authentication signal, counting, by an error counter, the number of errors in which a logical value of the equalizer output and a logical value of the authentication signal do not match based on the comparison signal, and determining, by a processor, whether the contact body is a biological tissue based on the number of errors.

According to an embodiment of the present disclosure, a fingerprint authentication device includes a fingerprint sensor that recognizes a fingerprint pattern of a contact body, a fingerprint detector that detects and reads the recognized fingerprint pattern, and a biometric authentication device that verifies whether the contact body is a biological tissue, and the biometric authentication device includes a clock generator that generates a clock signal, an authentication signal generator that generates an authentication signal based on the clock signal, a transmission electrode that transmits the authentication signal to a contact body, a reception electrode that receives a channel pass signal in which the authentication signal passes through a channel of the contact body, and a biometric authenticator that restores the channel pass signal and compares the restored channel pass signal with the authentication signal to generate a biometric authentication signal indicating whether the contact body is a biological tissue.

BRIEF DESCRIPTION OF THE FIGURES

The above and other objects and features of the present disclosure will become apparent by describing in detail embodiments thereof with reference to the accompanying drawings.

FIG. 8 is a flowchart illustrating an operation of a biometric authentication device, according to an embodiment of the present disclosure.

DETAILED DESCRIPTION

Hereinafter, embodiments of the present disclosure will be described in detail and clearly to such an extent that an ordinary one in the art easily implements the present disclosure.

Figure 1:
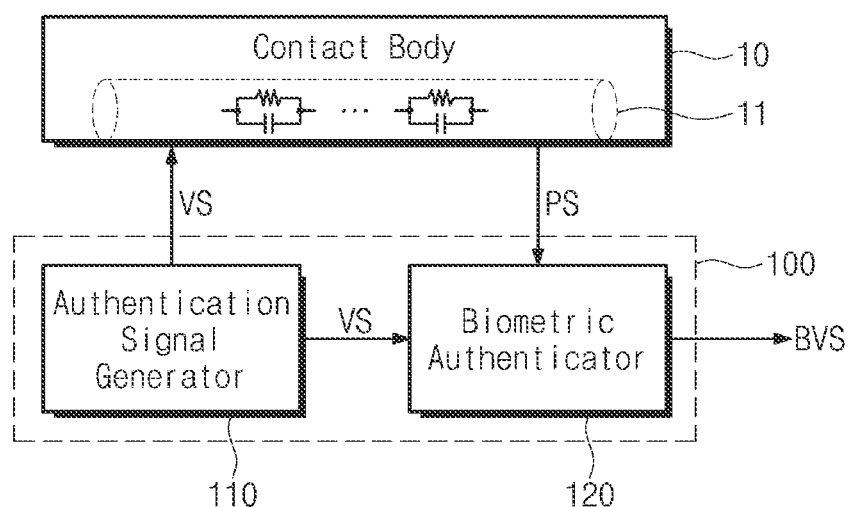
FIG. 1 is a block diagram schematically illustrating a biometric authentication device, according to an embodiment of the present disclosure.

FIG. 1 is a block diagram schematically illustrating a biometric authentication device, according to an embodiment of the present disclosure. A biometric authentication device 100 may include an authentication signal generator 110 and a biometric authenticator 120. According to some embodiments of the present disclosure, the biometric authentication device 100 may be implemented as a part of various electronic devices such as a smart phone, a smart pad, a wearable device, a digital camera, a television, and a monitor, a laptop computer, a black box system, a robot, etc. For example, the biometric authentication device 100 may be implemented as a part of a fingerprint authentication device (not illustrated) provided to various electronic devices, but the present disclosure is not limited thereto. According to an embodiment of the present disclosure, the biometric authentication device 100 may be implemented separately from the fingerprint authentication device (not illustrated).

The biometric authentication device 100 may transmit an authentication signal VS to a contact body 10. Here, the contact body 10 may be a human finger or a material other than a finger. For example, the other material may include a flexible and viscous material such as poly vinyl acetate. The other materials may include patterns that forge or imitate other people's fingerprint patterns. The contact body 10 may include a unique channel 11. The channel 11 may have a unique electrical channel characteristic that distorts a specific signal (e.g., the authentication signal VS). For example, the channel 11 may have similar electrical characteristics to a model made of a combination of a plurality of resistors and a plurality of capacitors, but is not limited thereto and may also be made similar to a combination of various circuit elements.

The authentication signal VS may be distorted while passing through the channel 11. The biometric authentication device 100 may restore a distorted signal (i.e., a channel pass signal PS). The biometric authentication device 100 may generate a biometric authentication signal BVS indicating whether the contact body 10 is a biological tissue (e.g., a finger) by comparing the authentication signal VS with the restored signal. Accordingly, the biometric authentication device 100 may verify whether the contact body 10 is a biological tissue.

The authentication signal generator 110 may generate the authentication signal VS. For example, the authentication signal VS may be a digital sequence having logic values of '0' or '1'. According to an embodiment of the present disclosure, the authentication signal VS may be an encrypted signal. The authentication signal generator 110 may transfer the authentication signal VS to the channel 11 of the contact body 10. Also, the authentication signal generator 110 may transfer the authentication signal VS to the biometric authenticator 120. A configuration and function of an example of the authentication signal generator 110 will be described in detail with reference to FIGS. 2 and 3.

The biometric authenticator 120 may receive a signal in which the authentication signal VS passes through the channel and is distorted, that is, the channel pass signal PS. The channel pass signal PS may have an irregular waveform compared to the authentication signal VS by being distorted by the unique electrical characteristics of the channel 11. The biometric authenticator 120 may restore the channel pass signal PS in the form of a digital sequence. According to an embodiment of the present disclosure, the biometric authenticator 120 may use a preset tap weight by reflecting the unique electrical characteristics of the channel 11 of the contact body 10 which is a biological tissue such as a finger. The tap weight may be set in consideration of a channel response characteristic of a biological tissue. The biometric authenticator 120 may generate the biometric authentication signal BVS indicating whether the contact body 10 is a biological tissue by comparing the authentication signal VS with the restored digital sequence. According to an embodiment of the present disclosure, the biometric authentication signal BVS may be configured in the form of a digital code indicating a difference from the authentication signal VS.

For example, when the contact body 10 is a biological tissue, the biometric authenticator 120 may restore the channel pass signal PS to a digital sequence similar to the authentication signal VS. In contrast, when the contact body 10 is not a biological tissue, the biometric authenticator 120 may restore the channel pass signal PS to a digital sequence different from the authentication signal VS. A configuration and function of an example of the biometric authenticator 120 will be described in detail with reference to FIGS. 2 and 3.

Figure 2:
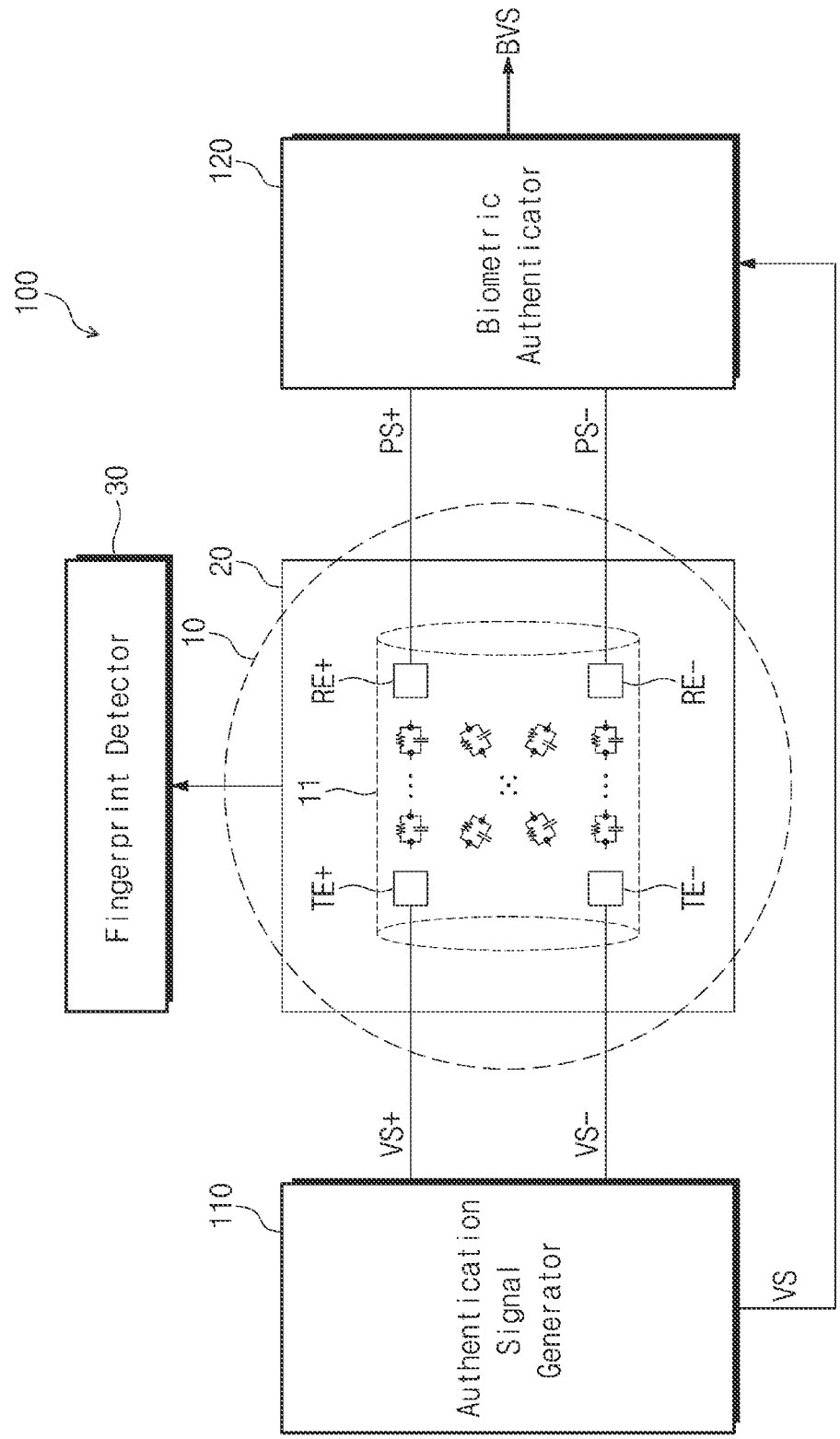
FIG. 2 is a block diagram illustrating a biometric authentication device, according to an embodiment of the present disclosure.

FIG. 2 is a block diagram illustrating a biometric authentication device, according to an embodiment of the present disclosure. Contents that overlap with those described in FIG. 1 will be omitted to avoid redundancy. The fingerprint sensor 20 and a fingerprint detector 30 may be provided outside the biometric authentication device 100. The fingerprint sensor 20 may recognize a fingerprint pattern of the contact body 10 in various methods (e.g., an optical method, an electrostatic method, or an ultrasonic method). The fingerprint detector 30 may detect and read the fingerprint pattern of the contact body 10 through the fingerprint sensor 20. According to an embodiment of the present disclosure, the fingerprint authentication device may include the fingerprint sensor 20, the fingerprint detector 30, and the biometric authentication device 100. However, the present disclosure is not limited thereto, and hereinafter, for convenience of description, it is assumed that the biometric authentication device 100 is implemented separately from the fingerprint sensor 20 and the fingerprint detector 30.

The biometric authentication device 100 may further include at least one transmission electrode (e.g., TE+, TE−) and at least one reception electrode (e.g., RE+, RE−). In FIG. 2, only two transmission electrodes TE+ and TE− and two reception electrodes RE+ and RE− are illustrated, but the present disclosure is not limited thereto. Accordingly, the number of the transmission electrode and the reception electrode may be one or three or more, respectively. For convenience of description, hereinafter, description will be made on the basis that two transmission electrodes TE+ and TE− and two reception electrodes RE+ and RE− are provided.

The transmission electrodes TE+ and TE− and the reception electrodes RE+ and RE− may be disposed on the fingerprint sensor 20. In some embodiments, the transmission electrodes TE+ and TE− and the reception electrodes RE+ and RE− may be disposed to partially protrude on the fingerprint sensor 20 or may be disposed inside the fingerprint sensor 20. However, the present disclosure is not limited thereto, and may be disposed in any manner in which the contact body 10 can contact the transmission electrodes TE+ and TE− and the reception electrodes RE+ and RE−.

The transmission electrodes TE+ and TE− may be electrically connected to the authentication signal generator 110 through an electric wire. The reception electrodes RE+ and RE− may be electrically connected to the biometric authenticator 120 through an electric wire. Here, the electrical wire may be disposed on the fingerprint sensor 20 or may be disposed through the fingerprint sensor 20, but the present disclosure is not limited thereto. According to an embodiment of the present disclosure, the transmission electrodes TE+ and TE−, the reception electrodes RE+ and RE−, and electric wires corresponding thereto may be detachably attached to the fingerprint sensor 20.

According to an embodiment, the authentication signal generator 110 may generate a first differential authentication signal VS+ and a second differential authentication signal VS− based on the authentication signal VS. For example, the second differential authentication signal VS+ may be a signal in which the first differential authentication signal VS+ is inverted. The authentication signal generator 110 may transfer the first differential authentication signal VS+ to the transmission electrode TE+. As in the above description, the authentication signal generator 110 may transfer the second differential authentication signal VS− to the transmission electrode TE−.

According to an embodiment, the biometric authenticator 120 may receive a first channel pass signal PS+ and a second channel pass signal PS− from the reception electrodes RE+ and RE−. For example, the second channel pass signal PS− may be a signal in which the first channel pass signal PS+ is inverted.

Figure 3:
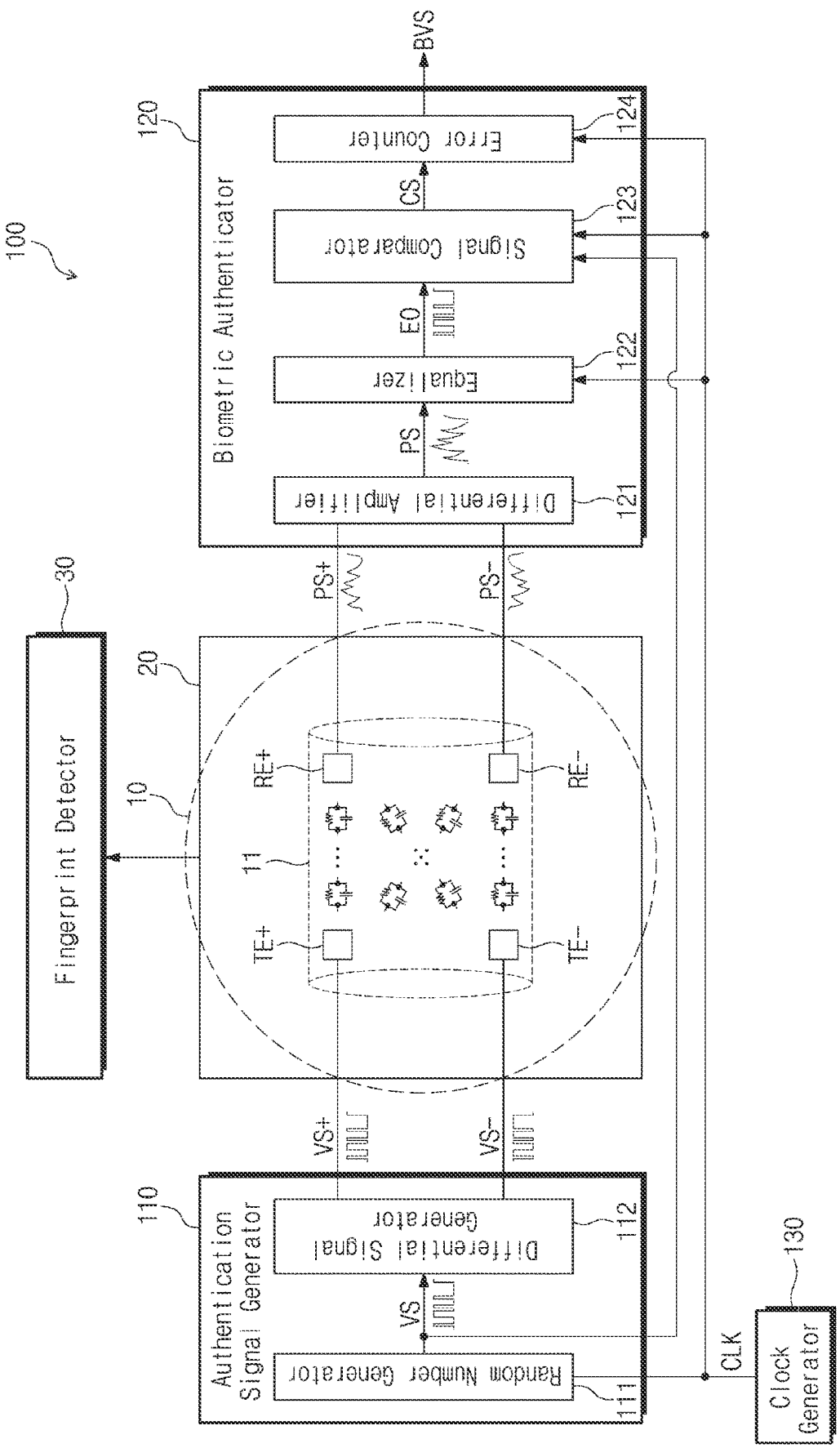
FIG. 3 is a block diagram illustrating a biometric authentication device of FIG. 2 in detail.

FIG. 3 is a block diagram illustrating a biometric authentication device of FIG. 2 in detail. Contents that overlap with those described in FIGS. 2 to 3 will be omitted to avoid redundancy.

The biometric authentication device 100 may further include a clock generator 130. The clock generator 130 may generate a clock signal CLK. A period of the clock signal CLK may be an arbitrary or preset value, and may vary depending on a user's request or a manufacturer's setting. For example, the clock generator 130 may generate the clock signal CLK based on a time when the contact body 10 comes into contact with the fingerprint sensor 20. Accordingly, the clock generator 130 may no longer generate the clock signal CLK when the contact body 10 moves away from the fingerprint sensor 20.

The authentication signal generator 110 may include a random number generator 111. The random number generator 111 may generate the authentication signal VS based on the clock signal CLK. According to an embodiment of the present disclosure, the random number generator 111 may include a pseudo random binary sequence (PRRS) generator. Accordingly, the random number generator 111 may generate a binary sequence (i.e., the authentication signal VS) in which logical values of '0' or '1' are arranged in arbitrary (or referred to as 'random') order in synchronization with the clock signal CLK. Accordingly, since the authentication signal VS is formed in an arbitrary sequence, information on the pattern of the authentication signal VS cannot be known from the outside, so that reliability of biometric authentication may be secured.

According to an embodiment of the present disclosure, the authentication signal generator 110 may include a differential signal generator 112. The differential signal generator 112 may generate the first differential authentication signal VS+ and the second differential authentication signal VS− based on the authentication signal VS. Since the authentication signal generator 110 generates the differential signal pair (VS+, VS−), sensitivity to interference variables such as noise may be reduced.

The biometric authenticator 120 may include a differential amplifier 121, an equalizer 122, a signal comparator 123, and an error counter 124. The differential amplifier 121 may receive the first differential pass signal PS+ and the second differential pass signal PS− from the reception electrodes RE+ and RE−. Although not illustrated, the differential amplifier 121 may include a positive input terminal and a negative input terminal. For example, the first differential pass signal PS+ may be input to the positive input terminal, and the second differential pass signal PS− may be input to the negative input terminal. The differential amplifier 121 may amplify a difference between the voltage level of the first differential pass signal PS+ and the voltage level of the second differential pass signal PS− to generate the channel pass signal PS.

The equalizer 122 may generate an equalizer output EO based on the channel pass signal PS. The equalizer 122 may restore the channel pass signal PS based on the tap weights. Here, the tap weights may be preset values to correct a signal that is distorted while passing through the biological tissue. As a result, the equalizer 122 may generate the equalizer output EO having a sequence of logic values of '0' or '1' by restoring the channel pass signal PS to a digital code form synchronized with the clock signal CLK.

The signal comparator 123 may generate a comparison signal CS based on the equalizer output EO and the authentication signal VS. The signal comparator 123 may compare the logic value of the equalizer output EO of a specific bit with the logic value of the authentication signal VS in synchronization with the clock signal CLK. For example, when the logic value of the equalizer output EO of a specific bit and the logic value of the authentication signal VS are the same, the signal comparator 123 may output the comparison signal CS having a logic value of '0'. In contrast, when the logic value of the equalizer output EO of a specific bit is different from the logic value of the authentication signal VS (in this case, it may be referred to as an error hereinafter), the signal comparator 123 may output the comparison signal CS having a logic value of '1'. However, the present disclosure is not limited thereto, and the signal comparator 123 may also output any form of comparison signal CS corresponding to a value obtained by comparing the logic value of the equalizer output EO with the logic value of the authentication signal VS.

The error counter 124 may generate the biometric authentication signal BVS based on the comparison signal CS. Whenever the comparison signal CS indicates an error (i.e., when the logic value of the equalizer output EO of a specific bit is different from the logic value of the authentication signal VS), the error counter 124 may count the number of errors. According to an embodiment of the present disclosure, the biometric authentication signal BVS may indicate the number of errors during an arbitrary or preset specific time period.

According to an embodiment of the present disclosure, the biometric authentication device 100 may further include a processor (not illustrated). The processor (not illustrated) may determine whether the contact body 10 is a biological tissue based on the biometric authentication signal BVS. When the number of errors during a specific time period is less than a threshold value, the processor (not illustrated) may determine that the contact body 10 is a biological tissue. In this case, the biometric authentication signal BVS may indicate that the contact body 10 is a biological tissue. In contrast, when the number of errors during a specific time period is equal to or greater than a threshold value, the processor (not illustrated) may determine that the contact body 10 is not a biological tissue. In this case, the biometric authentication signal BVS may indicate that the contact body 10 is not a biological tissue. For example, when the threshold value is a value of 20 and the number of errors indicated by the biometric authentication signal BVS is less than 20, the processor (not illustrated) may determine that the contact body 10 is a biological tissue.

According to another embodiment of the present disclosure, the processor (not illustrated) may be provided outside the biometric authentication device 100. For example, the processor (not illustrated) may be included in the fingerprint authentication device including the biometric authentication device 100. In this case, the processor (not illustrated) may detect and read a fingerprint pattern of the contact body 10 as well as determine whether the contact body 10 is a biological tissue.

Figure 4:
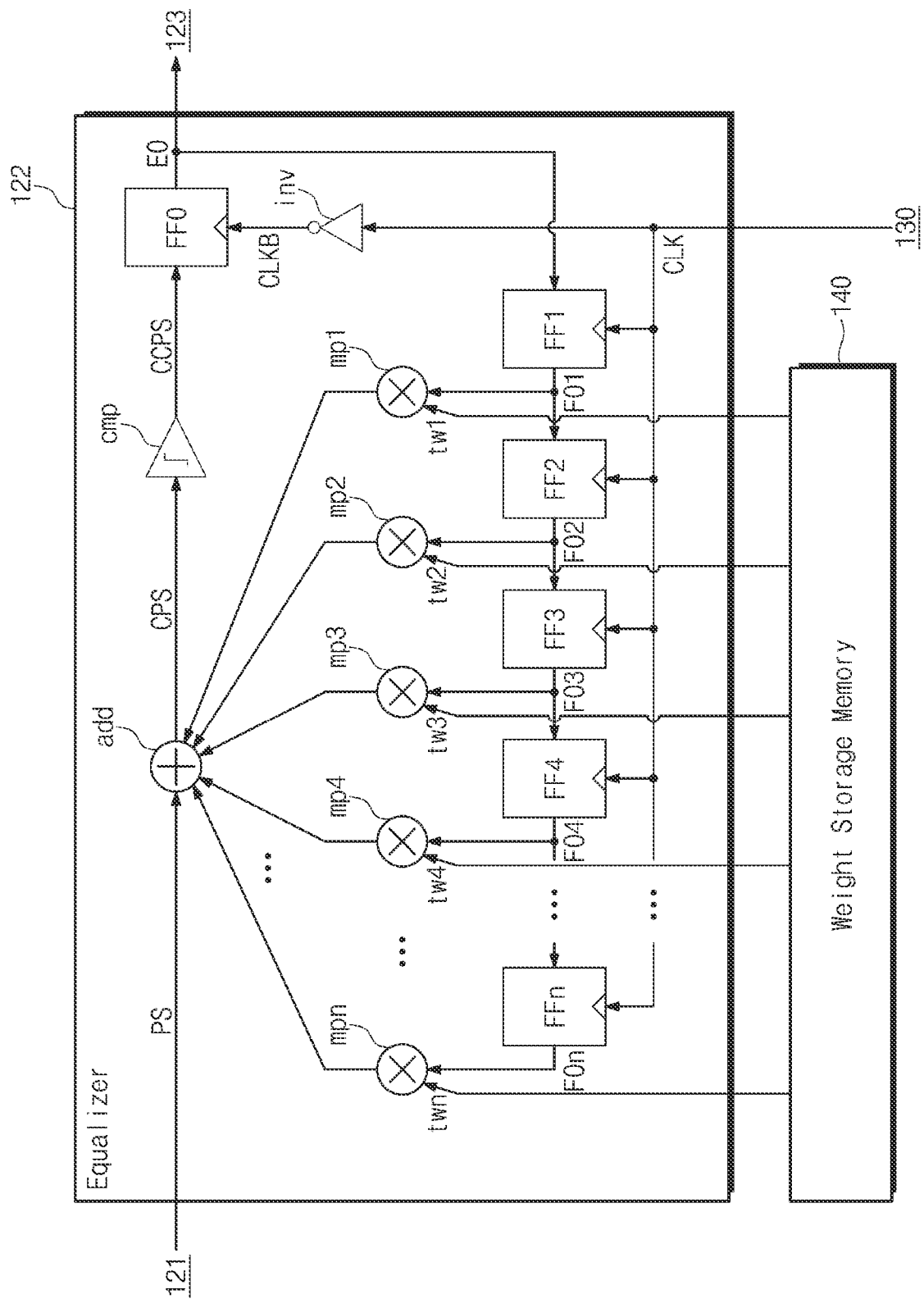
FIG. 4 is a block diagram illustrating an equalizer of FIG. 3 in detail.

FIG. 4 is a block diagram illustrating an equalizer of FIG. 3 in detail. Contents that overlap with those described in FIGS. 1 to 3 will be omitted to avoid redundancy. The equalizer 122 may include an adder 'add', a comparator 'cmp', an output stage flip-flop 'FFO', an inverter 'inv', a plurality of flip-flops FF1 to FFn, and a plurality of multipliers 'mp1 to mpn'.

The equalizer 122 may receive the channel pass signal PS from the differential amplifier 121. The adder 'add' may add outputs of the plurality of multipliers 'mp1 to mpn' to the channel pass signal PS to output a corrected channel pass signal CPS.

The comparator 'cmp' may compare the corrected channel pass signal CPS with a reference voltage to output a comparison bit value CCPS. Here, the reference voltage may have an arbitrary or preset voltage level, and may be provided from inside or outside the equalizer 122. For example, the comparison bit value CCPS may have a logic value of '0' or '1'. For example, when the voltage level of the corrected channel pass signal CPS is less than the reference voltage level, the comparator 'cmp' may output the comparison bit value CCPS having a logic value of '0'. For example, when the voltage level of the corrected channel pass signal CPS is greater than the reference voltage level, the comparator 'cmp' may output the comparison bit value CCPS having a logic value of '1'.

The inverter 'inv' may output an inverted clock signal CLKB based on the clock signal CLK. A phase of the inverted clock signal CLKB may be 180 degrees later than a phase of the clock signal CLK. The output stage flip-flop 'FFO' may latch the logic value of the comparison bit value CCPS at the edge of the inverted clock signal CLKB and may output the equalizer output EO having the latched logic value.

Each of the plurality of flip-flops FF1 to FFn may include an input terminal, an output terminal, and a clock terminal. Here, the number of the plurality of flip-flops FF1 to FFn may be a natural number 'n'. For example, each of the plurality of flip-flops FF1 to FFn may be a D flip-flop. The clock signal CLK may be input to the clock terminal of each of the plurality of flip-flops FF1 to FFn. Each of the plurality of flip-flops FF1 to FFn may latch the logic value of the input signal received through the input terminal at the edge of the clock signal CLK received through the clock terminal, and may output the output signal having the latched logic value through the output terminal.

According to an embodiment of the present disclosure, the equalizer output EO may be input to the input terminal of the flip-flop FF1 and a flip-flop output FO1 may be output from the output terminal of the flip-flop FF1. The flip-flop output FO1 may be input to the input terminal of the flip-flop FF2 and the multiplier 'mp1'. The multiplier 'mp1' may multiply the flip-flop output FO1 by a tap weight tw1. The output of the multiplier 'mp1' may be input to the adder 'add' as described above. As in the above description, the flip-flop output FO1 may be input to the input terminal of the flip-flop FF2, and a flip-flop output FO2 may be output from the output terminal of the flip-flop FF1. The flip-flop output FO2 may be input to the input terminal of the flip-flop FF3 and the multiplier 'mp2'. The multiplier 'mp2' may multiply the flip-flop output FO2 by a tap weight tw2. The output of the multiplier 'mp2' may be input to the adder 'add' as described above. That is, the plurality of flip-flops FF1 to FFn may be connected in a cascade form. Since the operation of the flip-flops FF3 to FFn and the multiplication by the multipliers mp3 to mpn using the tap weights tw3 to twn are similar to the operation of the flip-flop FF2, a description thereof will be omitted to avoid redundancy.

The tap weights tw1 to twn may be preset values according to a user's request or a manufacturer's setting. That is, the tap weights tw1 to twn may have values for restoring a signal distorted by an electrical response characteristic of a biological tissue channel. As a result, the magnitude of the signal (i.e., the channel pass signal PS) may be increased or decreased by the tap weights tw1 to twn. Therefore, when the contact body 10 is a biological tissue, the equalizer 122 may restore the channel pass signal PS to the equalizer output EO similar to the form of the authentication signal VS. In contrast, when the contact body 10 is not a biological tissue, the channel of the contact body 10 may have a characteristic different from the electrical response characteristic of the biological tissue channel. In this case, the channel pass signal PS may be excessively added or subtracted by the tap weights tw1 to twn, and accordingly, the equalizer output EO may have a different shape from the waveform of the authentication signal VS.

The tap weights tw1 to twn may be stored in a weight storage memory 140. According to an embodiment of the present disclosure, the biometric authentication device 100 may further include the weight storage memory 140. However, the present disclosure is not limited thereto, and the weight storage memory 140 may be provided outside the biometric authentication device 100. The weight storage memory 140 may include a volatile memory such as a dynamic random access memory (DRAM) and a static random access memory (SRAM) and/or a non-volatile memory such as a phase-change random access memory (PRAM), a magnetic random access memory (MRAM), a ferroelectric random access memory (FeRAM), a resistive random access memory (RRAM), a flash memory, solid state drives (SSDs), a read only memory (ROM), an electrically programmable ROM (EPROM), an electrically erasable programmable ROM (EEPROM), and a register.

Figure 5A:
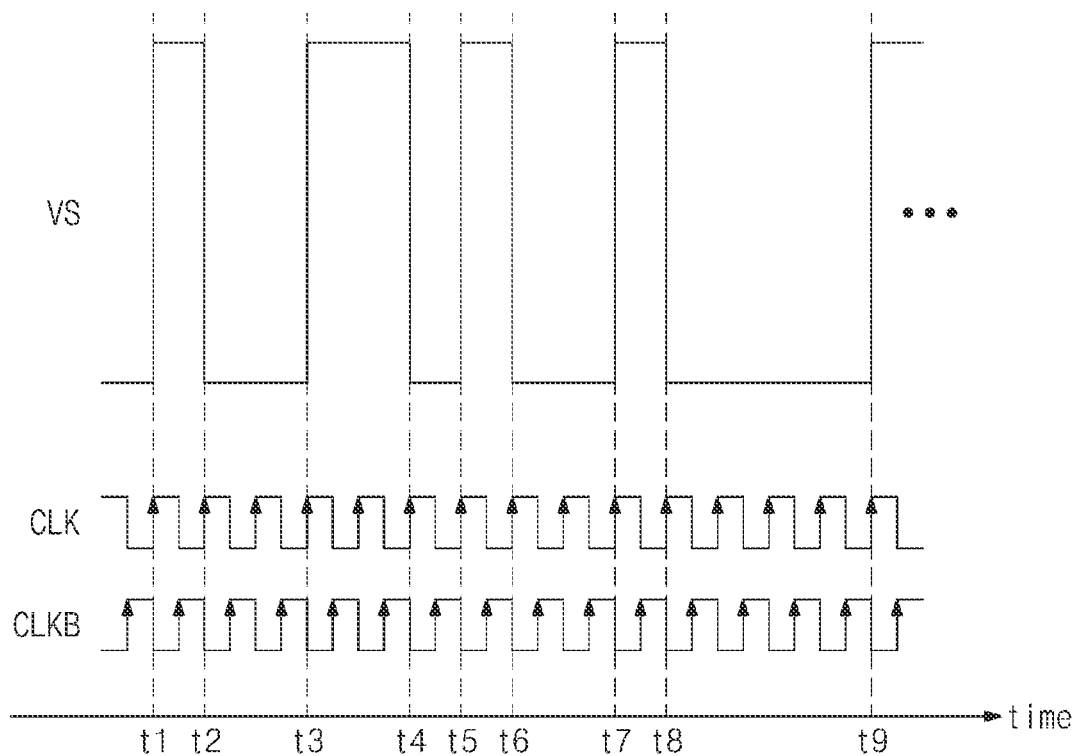
FIG. 5A is a timing diagram illustrating an operation of an authentication signal generator and an authentication signal, according to an embodiment of the present disclosure.

FIG. 5A is a timing diagram illustrating an operation of an authentication signal generator and an authentication signal, according to an embodiment of the present disclosure. For convenience of description, FIG. 5A will be described with reference to FIG. 3.

Referring to FIG. 5A, the authentication signal generator 110 may generate the authentication signal VS. The random number generator 111 may generate the authentication signal VS having an arbitrary digital sequence in synchronization with the clock signal CLK. In the present disclosure, the authentication signal VS of various waveforms may be generated, but for convenience of description, the authentication signal VS of a waveform as an example is illustrated.

According to an embodiment of the present disclosure, at time t1, the clock signal CLK may be toggled to a logic high. The authentication signal VS may transition to a logic high in synchronization with the clock signal CLK. At time t2, the clock signal CLK may be toggled to a logic high. The authentication signal VS may transition to a logic low in synchronization with the clock signal CLK.

In this way, the authentication signal VS may transition to a logic high in synchronization with the clock signal CLK at times t3, t5, t7, and t9. At times t4, t6, and t8, the authentication signal VS may transition to a logic low in synchronization with the clock signal CLK. Even after time t9, the authentication signal VS may make a rising or falling transition in synchronization with the clock signal CLK.

Figure 5B:
FIG. 5B is a graph illustrating a channel pass signal passing through a biological tissue channel, according to an embodiment of the present disclosure.

FIG. 5B is a graph illustrating a channel pass signal passing through a biological tissue channel, according to an embodiment of the present disclosure. For convenience of description, FIG. 5B will be described with reference to FIGS. 3 and 5A. The authentication signal VS illustrated in FIG. 5B as an example may pass through the channel 11 of the contact body 10 (i.e., a finger) with a biological tissue. The authentication signal VS may be distorted depending on an inherent electrical response characteristic of the biological tissue channel. The distorted authentication signal (i.e., the channel pass signal PS) may have an irregular voltage level according to times as illustrated.

Figure 5C:
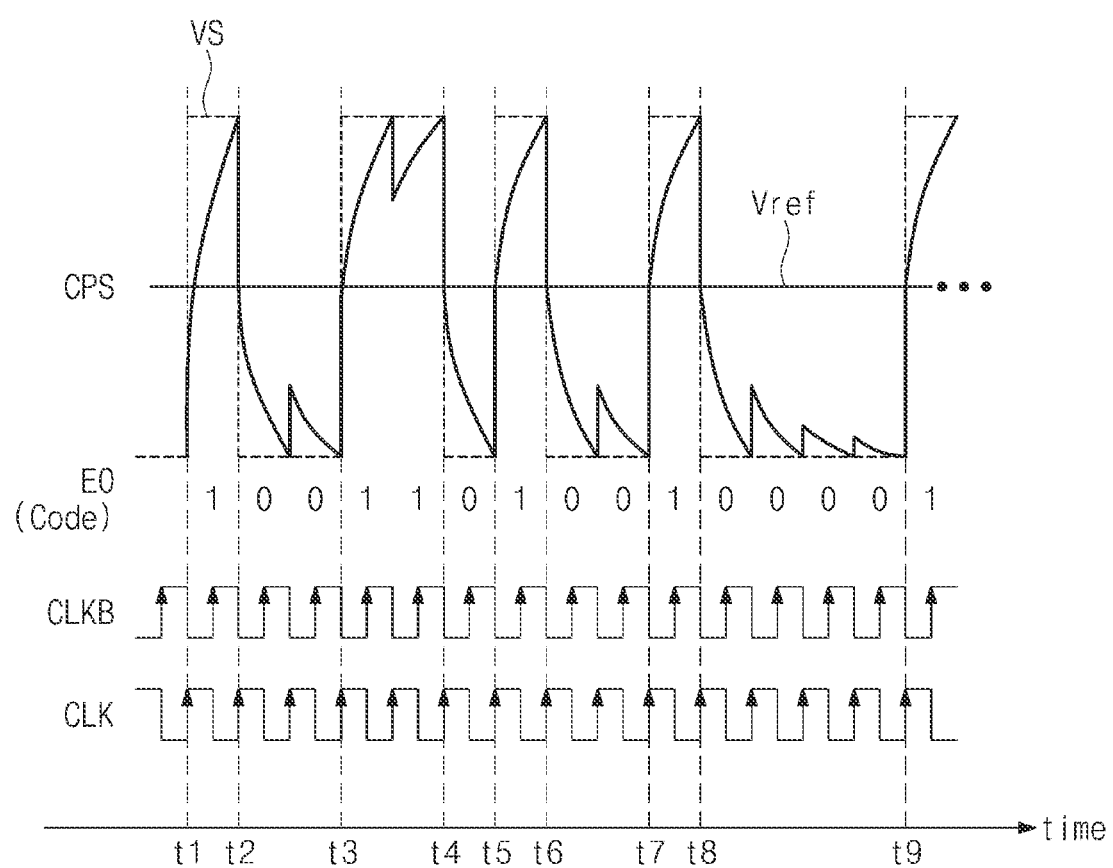
FIG. 5C is a timing diagram illustrating an operation of a biometric authenticator according to a channel pass signal of FIG. 5B.

FIG. 5C is a timing diagram illustrating an operation of a biometric authenticator according to a channel pass signal of FIG. 5B. For convenience of description, FIG. 5B will be described with reference to FIGS. 3 to 5B.

Referring to FIG. 5C, the biometric authenticator 120 may restore the channel pass signal PS to the equalizer output EO in the form of a digital sequence through a process of passing the corrected channel pass signal CPS. When the voltage level of the channel pass signal CPS is greater than the level of a reference voltage Vref, the equalizer 122 may output the equalizer output EO, which is bits with logic values of '1' in synchronization with the clock signal CLK and/or the inverted clock signal CLKB. In contrast, when the voltage level of the channel pass signal CPS is less than the level of the reference voltage Vref, the equalizer 122 may output the equalizer output EO, which is bits with logic values of '0' in synchronization with the clock signal CLK and/or the inverted clock signal CLKB. Since bits of the equalizer output EO and bits corresponding to the voltage level of the authentication signal VS coincide with each other, the biometric authentication signal BVS may indicate that the contact body 10 is a biological tissue.

Figure 6A:
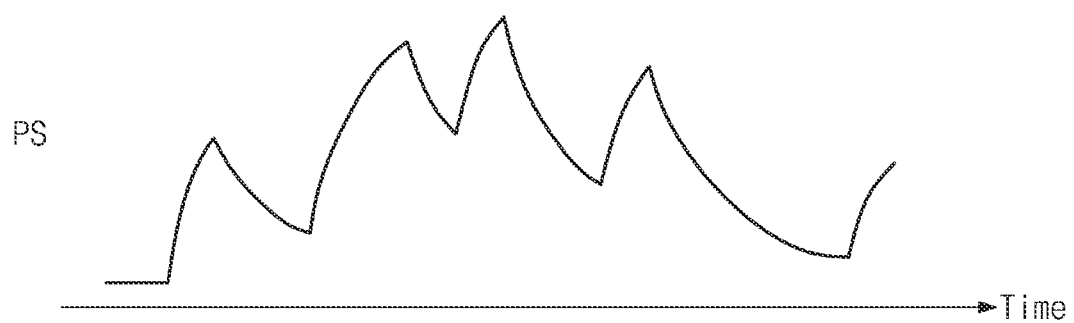
FIG. 6A is a graph illustrating a channel pass signal passing through a non-biological tissue channel, according to an embodiment of the present disclosure.

FIG. 6A is a graph illustrating a channel pass signal passing through a non-biological tissue channel, according to an embodiment of the present disclosure. For convenience of description, FIG. 6A will be described with reference to FIG. 3. The authentication signal VS illustrated in FIG. 6A as an example may pass through a channel 11 of a non-biological tissue contact body 10 (e.g., someone else's finger with a fake fingerprint made of a specific material). The authentication signal VS may be distorted depending on an inherent electrical response characteristic of the non-biological tissue channel. The distorted authentication signal (i.e., the channel pass signal PS) may have an irregular voltage level according to times as illustrated.

Figure 6B:
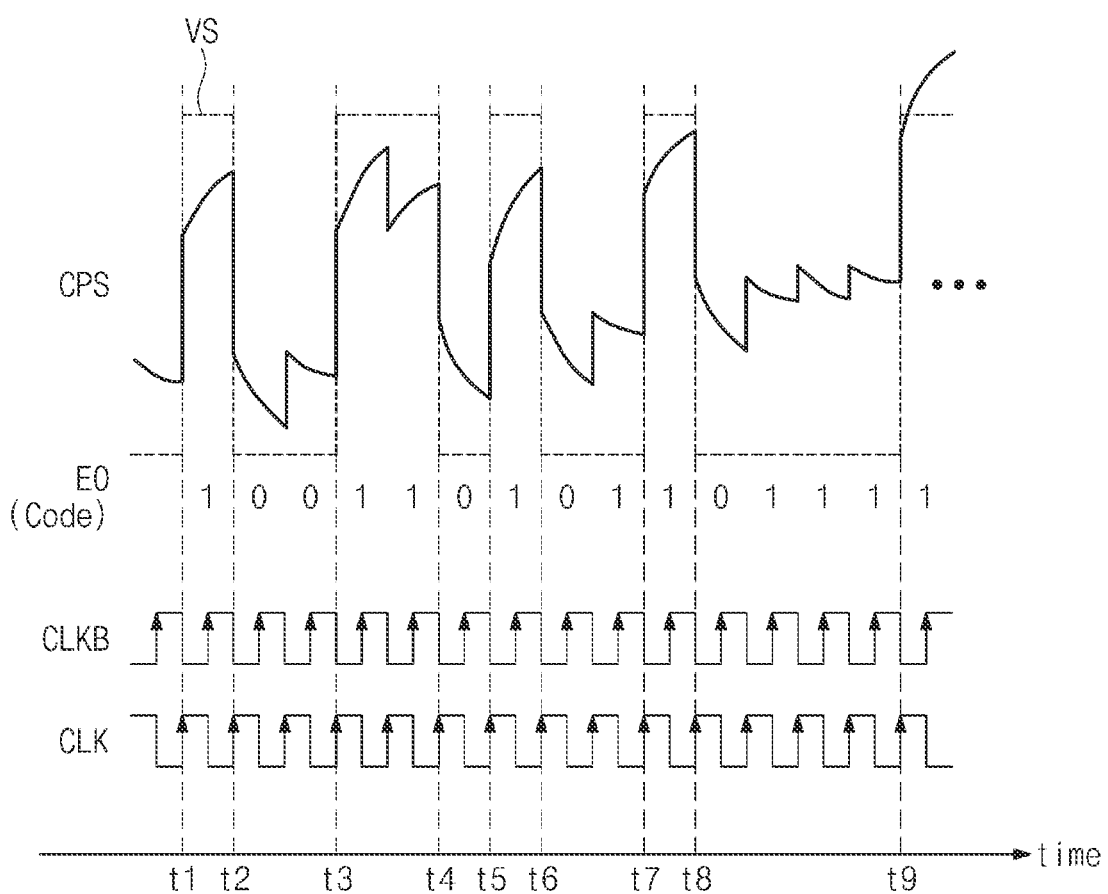
FIG. 6B is a timing diagram illustrating an operation of a biometric authenticator according to a channel pass signal of FIG. 6A.

FIG. 6B is a timing diagram illustrating an operation of a biometric authenticator according to a channel pass signal of FIG. 6A. Contents that overlap with those described in FIG. 5C will be omitted to avoid redundancy. The level of a reference voltage in FIG. 6B is similar to that illustrated in FIG. 5C, and thus additional description will be omitted to avoid redundancy. For convenience of description, FIG. 6B will be described with reference to FIGS. 3, 4, and 6A.

Referring to FIG. 6B, since the contact body 10 is not a biological tissue, the channel of the contact body 10 may have a characteristic different from the electrical response characteristic of the biological tissue channel. In this case, the channel pass signal PS may be excessively added or subtracted by the tap weights tw1 to twn. Accordingly, as illustrated in FIG. 6B, the corrected channel pass signal CPS may have a different shape from the waveform of the authentication signal VS. As a result, bits of the equalizer output EO and bits corresponding to the voltage level of the authentication signal VS may not coincide with each other.

As illustrated, in the time period between time t6 and time t7, bits corresponding to the voltage level of the authentication signal VS are '00', whereas bits of the equalizer output EO are '01'. As illustrated, in the time period between time t8 and time t9, bits corresponding to the voltage level of the authentication signal VS are '0000', whereas bits of the equalizer output EO are '0111'. Accordingly, based on the equalizer output EO having a total of 14 bits in the time period from time t1 to time t9, the number of errors is 4 in total.

Figure 7:
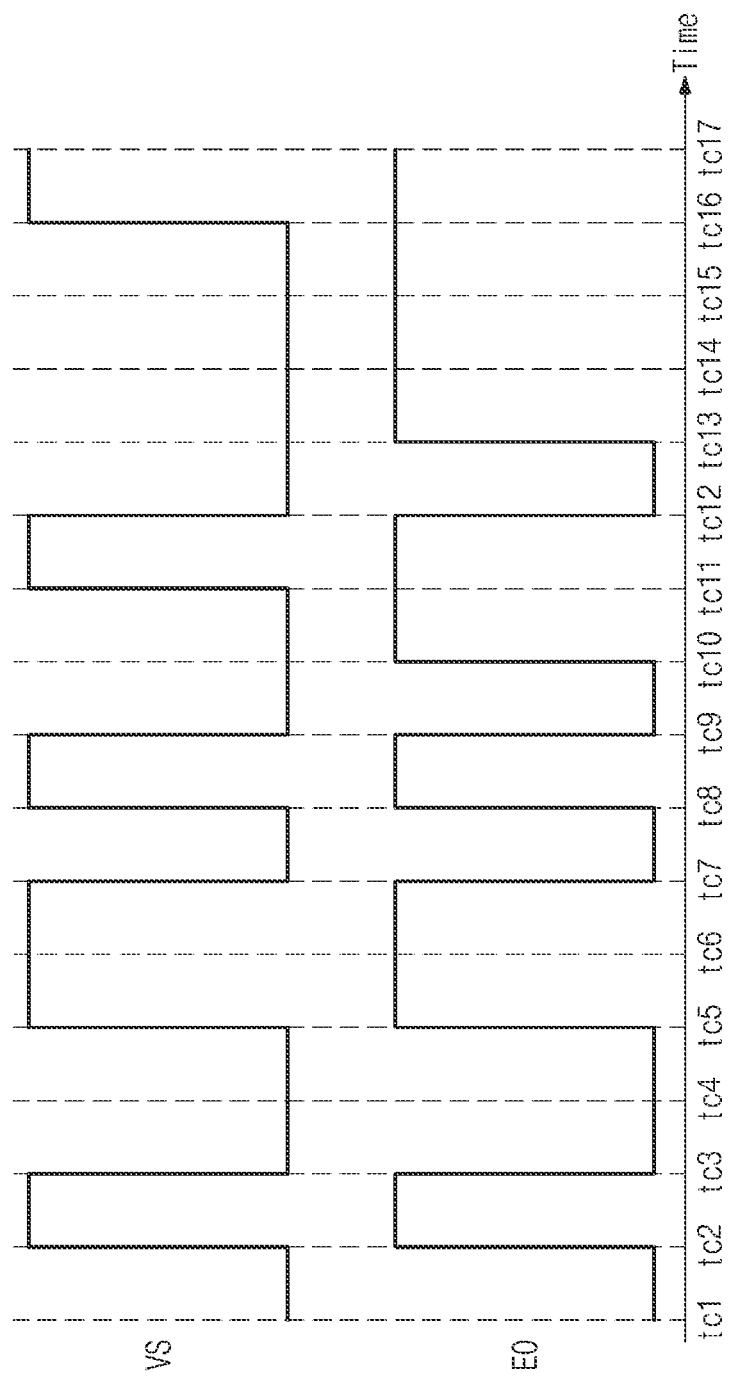
FIG. 7 is a timing diagram illustrating an operation of a signal comparator and an error counter of FIG. 3.

FIG. 7 is a timing diagram illustrating an operation of a signal comparator and an error counter of FIG. 3. For convenience of description, FIG. 7 will be described with reference to FIG. 3. Referring to FIG. 7, the signal comparator 123 may compare the authentication signal VS with the equalizer output EO in synchronization with the clock signal CLK.

The error counter 124 may count the number of errors from time tc1 to time tc17. A time period from a specific time (e.g., tc1) to a next time (e.g., tc2) is a unit time period, and the error counter 124 may count as one error when an error occurs in the unit time period.

In the time period from time tc1 to time tc10, the logic value of the authentication signal VS and the logic value of the equalizer output EO are the same. Since no error occurred in the time period from time tc1 to time tc10, the total number of errors counted by the error counter 124 is zero. In one unit time period between time tc10 and time tc11, the logic value of the equalizer output EO is logic low, whereas the logic value of the authentication signal VS is a logic high. Accordingly, the total number of errors counted by the error counter 124 until time tc11 is 1. In a time period between time tc11 and time tc13, the logic value of the authentication signal VS and the logic value of the equalizer output EO are the same. Accordingly, the total number of errors counted by the error counter 124 until time tc11 is still 1. In three unit time period between time tc13 and time tc16, the logic value of the equalizer output EO is logic low, whereas the logic value of the authentication signal VS is a logic high. Accordingly, the total number of errors counted by the error counter 124 until time tc16 is 4 (i.e., 1+3). In the time period from time tc1 to time tc10, the logic value of the authentication signal VS and the logic value of the equalizer output EO are the same. Accordingly, the total number of errors counted by the error counter 124 until time tc17 is 4.

FIG. 8 is a flowchart illustrating an operation of the biometric authentication device 100, according to an embodiment of the present disclosure. For convenience of description, FIG. 8 will be described with reference to FIGS. 1 to 4.

In operation S110, the authentication signal generator 110 may generate the authentication signal VS to determine whether the contact body 10 is a biological tissue. According to an embodiment of the present disclosure, the authentication signal VS may be implemented in the form of a differential signal pair. According to an embodiment of the present disclosure, the random number generator 111 may generate the authentication signal VS having a random binary sequence.

In operation S120, the authentication signal VS may pass through the channel 11 of the contact body 10. According to an embodiment of the present disclosure, the authentication signal VS may pass through the channel 11 through the transmission electrode and the reception electrode. Since the channel 11 has an electrical response characteristic of a biological tissue or other material (medium), the authentication signal VS may be distorted while passing through the channel 11. The distorted signal (i.e., the channel pass signal PS) may be transferred to the biometric authenticator 120 through the reception electrode.

In operation S130, the equalizer 122 may restore the channel pass signal PS to a digital sequence type signal (i.e., the equalizer output EO) based on a tap weight. In this case, the tap weight may be a value for restoring a signal distorted by an electrical response characteristic of a biological tissue channel.

In operation S140, the signal comparator 123 may generate comparison data (i.e., the comparison signal CS) by comparing the equalizer output EO and the authentication signal VS. The comparison signal CS may indicate whether the logic value of the equalizer output EO is the same as the logic value of the authentication signal VS.

In operation S150, the error counter 124 may generate the biometric authentication signal BVS indicating the number of errors based on the comparison signal CS. The processor (not illustrated) may determine whether the contact body 10 is a biological tissue based on the biometric authentication signal BVS.

According to an embodiment of the present disclosure, it is possible to improve the security of a fingerprint authentication device by supplementing the security vulnerability caused by counterfeit or fake fingerprints.

The above description refers to embodiments for implementing the present disclosure. Embodiments in which a design is changed simply or which are easily changed may be included in the present disclosure as well as an embodiment described above. In addition, technologies that are easily changed and implemented by using the above embodiments may be included in the present disclosure. While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A biometric authentication device comprising:
a clock generator configured to generate a clock signal;
an authentication signal generator configured to generate an authentication signal based on the clock signal;
a transmission electrode configured to transmit the authentication signal to a contact body;
a reception electrode configured to receive a channel pass signal in which the authentication signal passes through a channel of the contact body; and
a biometric authenticator configured to restore the channel pass signal and to compare the restored channel pass signal with the authentication signal to generate a biometric authentication signal indicating whether the contact body is a biological tissue;
wherein the biometric authenticator includes:
an equalizer configured to restore the channel pass signal based on a tap weight reflecting a channel response characteristic of the biological tissue and to generate an equalizer output which is the restored channel pass signal, and
wherein the equalizer includes:
an adder configured to add the channel pass signal by outputs of first and second multipliers to output a corrected channel pass signal;
a comparator configured to compare the corrected channel pass signal with a reference voltage to output a comparison bit value; and
an inverter configured to output an inverted clock signal based on the clock signal.

2. The biometric authentication device of claim 1, wherein the biometric authenticator compares the equalizer output with the authentication signal to generate the biometric authentication signal.

3. The biometric authentication device of claim 2, wherein the equalizer further includes:
an output stage flip-flop configured to latch a logical value of the comparison bit value at an edge of the inverted clock signal and to output the equalizer output having the latched logical value of the comparison bit value;
a first flip-flop configured to latch a logic value of the equalizer output at an edge of the clock signal and to output a first flip-flop output having the latched logic value of the equalizer output;
a second flip-flop configured to latch a logic value of the first flip-flop output at an edge of the clock signal and to output a second flip-flop output having the latched logic value of the first flip-flop output;
a first multiplier configured to multiply and output the first flip-flop output by a first tap weight; and
a second multiplier configured to multiply and output the second flip-flop output by a second tap weight.

4. The biometric authentication device of claim 2, further comprising:
a weight storage memory configured to store the tap weights.

5. The biometric authentication device of claim 2, wherein the biometric authenticator further includes:
a signal comparator configured to generate a comparison signal obtained by comparing a logical value of the equalizer output and a logical value of the authentication signal in units of bits; and
an error counter configured to count the number of errors in which the logical value of the equalizer output and the logical value of the authentication signal do not match based on the comparison signal.

6. The biometric authentication device of claim 5, further comprising:
a processor configured to generate the biometric authentication signal indicating that the contact body is not the biological tissue when the number of errors is greater than or equal to a threshold value, and to generate the biometric authentication signal indicating that the contact body is the biological tissue when the number of errors is less than the threshold value.

7. The biometric authentication device of claim 1, wherein the authentication signal generator further includes:
a random number generator configured to generate the authentication signal having a random digital sequence in synchronization with the clock signal.

8. The biometric authentication device of claim 1, wherein the authentication signal generator includes a differential signal generator configured to generate a first differential authentication signal and a second differential authentication signal based on the authentication signal,
wherein the biometric authenticator includes a differential amplifier configured to generate the channel pass signal based on a first differential pass signal and a second differential pass signal, and
wherein the first differential pass signal and the second differential pass signal are signals obtained by passing the first differential authentication signal and the second differential authentication signal through a channel of the contact body.

9. A method of operating a biometric authentication device, the method comprising:
generating, by an authentication signal generator, an authentication signal;
passing the authentication signal through a channel of a contact body through a transmission electrode and a reception electrode;
generating, by an equalizer, an equalizer output by restoring the channel pass signal to a signal in a form of a digital sequence based on a tap weight;
generating, by a signal comparator, a comparison signal obtained by comparing the equalizer output with the authentication signal;
counting, by an error counter, the number of errors in which a logical value of the equalizer output and a logical value of the authentication signal do not match based on the comparison signal; and
determining, by a processor, whether the contact body is a biological tissue based on the number of errors,
wherein the equalizer includes:
an adder configured to add the channel pass signal by outputs of first and second multipliers to output a corrected channel pass signal;
a comparator configured to compare the corrected channel pass signal with a reference voltage to output a comparison bit value; and
an inverter configured to output an inverted clock signal based on the clock signal.

10. A fingerprint authentication device comprising:
a fingerprint sensor configured to recognize a fingerprint pattern of a contact body;
a fingerprint detector configured to detect and read the recognized fingerprint pattern; and
a biometric authentication device configured to verify whether the contact body is a biological tissue, and
wherein the biometric authentication device includes:
a clock generator configured to generate a clock signal;
an authentication signal generator configured to generate an authentication signal based on the clock signal;
a transmission electrode configured to transmit the authentication signal to the contact body;
a reception electrode configured to receive a channel pass signal in which the authentication signal passes through a channel of the contact body; and
a biometric authenticator configured to restore the channel pass signal and to compare the restored channel pass signal with the authentication signal to generate a biometric authentication signal indicating whether the contact body is a biological tissue,
wherein the biometric authenticator includes:
an equalizer configured to restore the channel pass signal based on a tap weight reflecting a channel response characteristic of the biological tissue and to generate an equalizer output which is the restored channel pass signal, and
wherein the equalizer includes:
an adder configured to add the channel pass signal by outputs of first and second multipliers to output a corrected channel pass signal;
a comparator configured to compare the corrected channel pass signal with a reference voltage to output a comparison bit value; and
an inverter configured to output an inverted clock signal based on the clock signal.

11. The fingerprint authentication device of claim 10, wherein the transmission electrode and the reception electrode are disposed on the fingerprint sensor.

12. The fingerprint authentication device of claim 10, wherein the biometric authenticator compares the equalizer output with the authentication signal and determines whether the contact body is the biological tissue.

13. The fingerprint authentication device of claim 12, wherein the equalizer further includes:
an output stage flip-flop configured to latch a logical value of the comparison bit value at an edge of the inverted clock signal and to output the equalizer output having the latched logical value of the comparison bit value;
a first flip-flop configured to latch a logic value of the equalizer output at an edge of the clock signal and to output a first flip-flop output having the latched logic value of the equalizer output;
a second flip-flop configured to latch a logic value of the first flip-flop output at an edge of the clock signal and to output a second flip-flop output having the latched logic value of the first flip-flop output;
a first multiplier configured to multiply and output the first flip-flop output by a first tap weight; and
a second multiplier configured to multiply and output the second flip-flop output by a second tap weight.

14. The fingerprint authentication device of claim 10, further comprising:
a processor configured to determine whether the contact body is the biological tissue and to read the recognized fingerprint pattern of the contact body.

* * * * *